United States Patent
Eswaran et al.

(10) Patent No.: US 7,873,054 B2
(45) Date of Patent: Jan. 18, 2011

(54) PATTERN MATCHING IN A NETWORK FLOW ACROSS MULTIPLE PACKETS

(75) Inventors: Anand Eswaran, Bangalore (IN); Ravindra Guntur, Mysore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 240 days.

(21) Appl. No.: 11/853,841

(22) Filed: Sep. 12, 2007

(65) Prior Publication Data
US 2009/0028143 A1    Jan. 29, 2009

(30) Foreign Application Priority Data
Jul. 26, 2007    (IN) .................. 1617/CHE/2007

(51) Int. Cl.
*H04L 12/28* (2006.01)
(52) U.S. Cl. ............. 370/395.32; 370/389; 370/395.31; 370/351; 726/13; 726/14; 726/18
(58) Field of Classification Search ................. 713/181, 713/151, 168; 370/49, 389, 392, 324, 327, 370/332, 395, 395.3; 726/13, 23, 24, 25
See application file for complete search history.

(56) References Cited

U.S. PATENT DOCUMENTS

| 6,560,599 | B1 * | 5/2003 | Boa et al. ...................... 707/7 |
| 2004/0030921 | A1 * | 2/2004 | Aldridge et al. ............. 713/200 |
| 2006/0020796 | A1 * | 1/2006 | Aura et al. .................. 713/168 |
| 2006/0193159 | A1 * | 8/2006 | Tan et al. ...................... 365/49 |
| 2006/0195698 | A1 * | 8/2006 | Pinkerton et al. ........... 713/181 |
| 2007/0206637 | A1 * | 9/2007 | Miller et al. ................ 370/474 |
| 2008/0235772 | A1 * | 9/2008 | Janzen ........................ 726/5 |

* cited by examiner

*Primary Examiner*—Pankaj Kumar
*Assistant Examiner*—Anez Ebrahim

(57) ABSTRACT

Pattern matching for a network flow includes storing a representation of the pattern. The representation of the pattern includes hash values representing blocks of data in the pattern. Hash values are calculated for blocks of data in the network flow. The blocks of data are spread across multiple packets in the network flow. The calculated hash values for the blocks of data in the network flow are compared to the hash values in the representation of the pattern to detect the pattern in the network flow.

20 Claims, 7 Drawing Sheets

105

| STARTING HASH | ENDING HASH | NUMBER OF BLOCKS |
|---|---|---|
| $k_1=h(D_1,S)$ | $k_n=h(D_n,k_{n-1})$ | n |
| ■ | ■ | ■ |
| ■ | ■ | ■ |
| ■ | ■ | ■ |
|  |  |  |
|  |  |  |

| FLOW HASH | CURRENT CONTENT HASH | BLOCKS COVERED |
|---|---|---|
| $F_{ID}=h(flowID)$ | $k_i=h(B_i,S)$ | n |
| $F_{ID}=h(flowID)$ | $k_{i+1}=h(B_{i+1},k_i)$ | n-1 |
| ■ | ■ | ■ |
|  | ■ | ■ |
| ■ |  |  |
| $F_{ID}=h(flowID)$ | $k_n=h(B_n,k_{n-1})$ | 0 |

*FIG. 3B*

PATTERN MATCHING IN A NETWORK FLOW ACROSS MULTIPLE PACKETS

BACKGROUND

Identifying patterns or strings of interest in network packet streams has practical uses in fields as diverse as databases, network security and computer vision or imaging. Many known functions for performing single or multiple pattern matching exist. The worst case performance for the more efficient of these functions is linear to the amount of data being matched against a pattern. For example, the search speeds for finite state automaton (FSA) based functions, such as Knuth-Morris-Pratt and Aho-Corasick, are generally linear to the data size and at the same time independent of number of target signature strings to match against. However, these techniques generally utilize a large amount of system memory, such as random access memory (RAM), required to store such a FSA. The use of these types of memory-based schemes also reduces the rate at which patterns can be matched due to the frequent memory fetch operations, thus making the schemes infeasible for gigaspeed routers. For high speed operations, hardware alternatives using field programmable arrays (FPGAs) exist, but these schemes are not flexible when the target patterns to look for frequently change. Also, hardware costs for implementing the matching function using FPGAs becomes high.

Hash-based schemes offer a good alternative to FSA-based implementations as they can efficiently store the list of signature strings in a small amount of memory. However, known hash-based scheme suffer from the inherent disadvantage of false positives, i.e., the hash values of distinct patterns may be equal. Furthermore, known hash-based schemes may not be used to identify long patterns spread across multiple packets, because these schemes cannot store the state of data when data possibly including a large target pattern is split among several packets.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 3A illustrates a pattern content addressable memory, according to an embodiment;

FIG. 3B illustrates a packet content addressable memory, according to an embodiment;

DETAILED DESCRIPTION OF THE EMBODIMENTS

Figure 1:
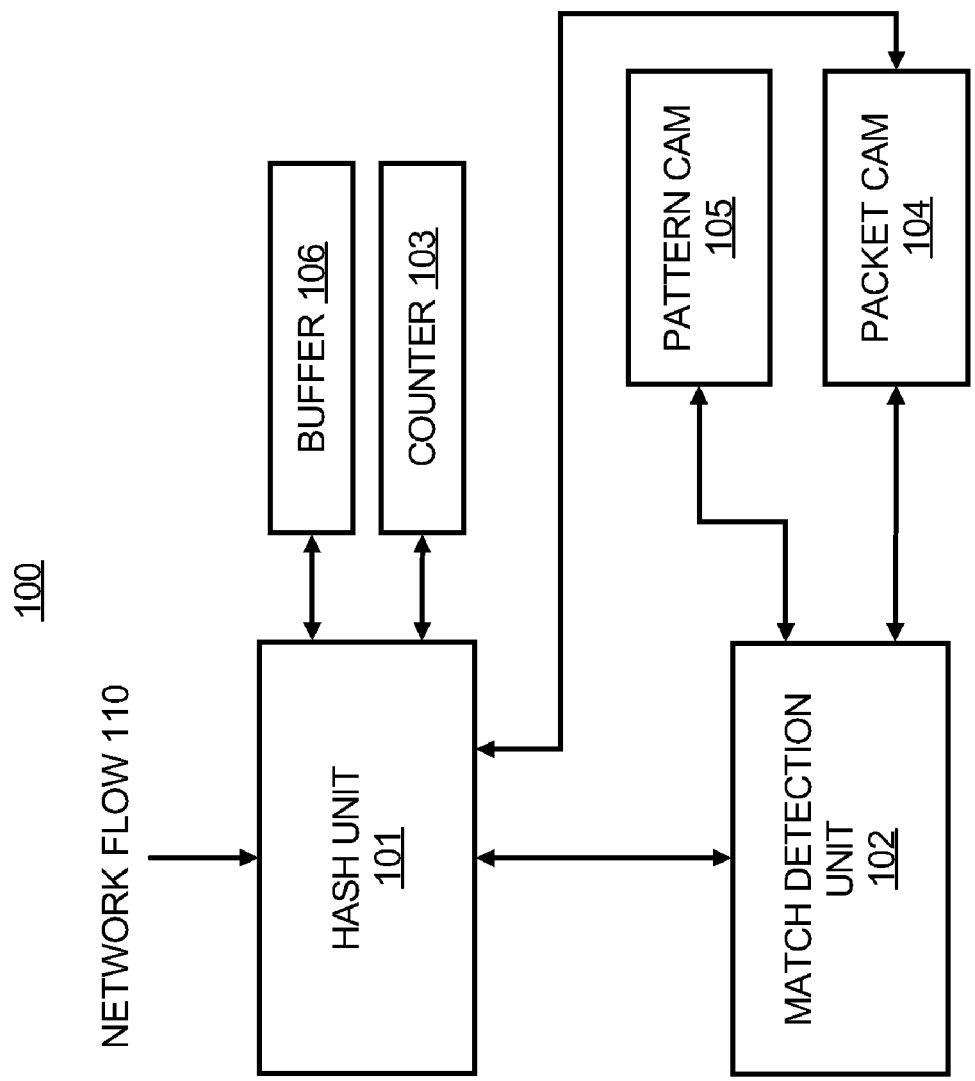
FIG. 1 illustrates a pattern detection system which may be used in a network switch, according to an embodiment.

For simplicity and illustrative purposes, the present invention is described by referring mainly to exemplary embodiments. In the following description, numerous specific details are set forth in order to provide a thorough understanding of the embodiments. It will be apparent however, to one of ordinary skill in the art, that the embodiments may be practiced without limitation to these specific details. Well known methods and structures may not be described in detail, so as not to unnecessarily obscure the description of the embodiments.

According to embodiments described herein, hash-based pattern matching is performed for a network flow. A network flow includes a stream of packets, and the pattern may be spread across multiple packets in the stream. For example, a pattern string S=cd1110 may be spread across packets P1 and P2. The payload of P1 is ab00ff000000abcd and the payload of the second consecutive packet P2 in the network flow is 11100778505dab. The pattern S is spread across packets P1 and P2, and hashing-based pattern matching, as described in detail below, may be used to identify the pattern S in P1 and P2.

According to an embodiment, a pattern detection system is operable to detect patterns that may be spread across multiple packets in a network flow. The pattern detection system may use one or more content addressable memories (CAMs) to store hash values representing patterns and representing data blocks in the network flow. The CAMs may be used to quickly access the stored hash values to detect patterns at line-rate speed for a router.

According to an embodiment, the pattern detection system stores a representation of a pattern in a CAM, wherein the representation includes hash values representing the sequence of consecutive data blocks in a pattern and a count of the number of data blocks in the pattern. The pattern detection system also calculates hash values for a sequence of consecutive data blocks in the network flow and determines a count of the number of data blocks in the network flow matching the pattern. The counts and hash values are compared to detect the pattern. By hashing sequences of consecutive data blocks for the pattern and network flow, patterns can be detected even if the patterns are spread across multiple packets in the network flow. Also, the counts are compared to detect the pattern and to provide an accurate determination of pattern detection in the network flow.

The pattern matching may be performed for one or more network flows and each flow may be uniquely identified. For example, a network flow may be uniquely identified by a set of indices, such as source/destination IP addresses or source/destination ports in a network switch, etc. A network switch may include a router, or other type of network switch.

Also, hash values for data blocks may be used to detect patterns because hash values may use less storage space than storing an actual string. This allows conventional off-the-shelf CAMs to be used for pattern detection, because these CAMs are limited in the amount of data they can store.

FIG. 1 illustrates a pattern detection system 100, according to an embodiment, that may be used to detect a pattern in a network flow. The pattern detection system 100 includes a hash unit 101, a match detection unit 102, a counter 103, a pattern CAM 105 and a packet CAM 104.

The hash unit 101 receives packet payloads for packets in the network flow 110 and generates hash values for data in the payloads. The pattern detection system 100 may be incorporated in a network switch, and the hash unit 101 may receive packets for the network flow from ports in a line card for the network switch, such as described with respect to FIG. 6.

According to an embodiment, the packet payloads are divided into a set of consecutive, overlapping data blocks having a same length. The hash unit 101 uses a hash function h( ) to hash each data block and stores the hash value of the hash of each data block in the packet CAM 104.

Figure 2:
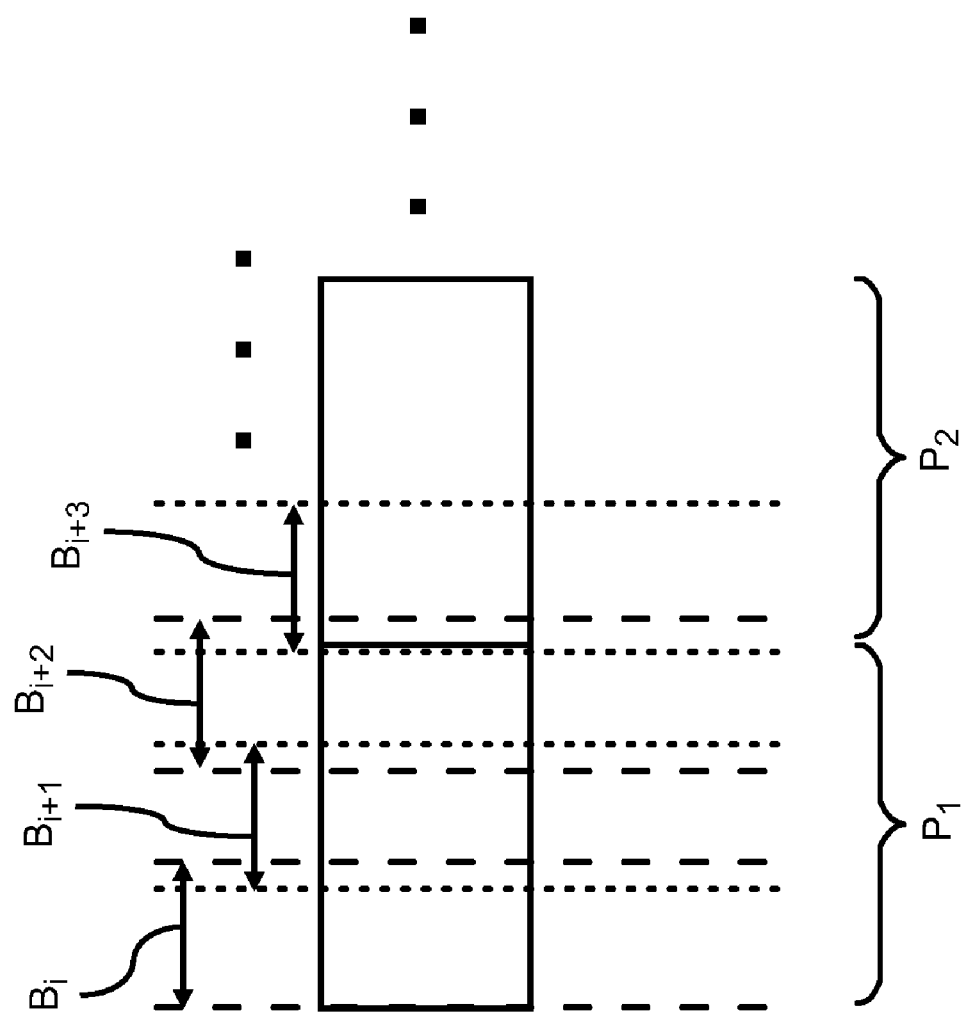
FIG. 2 illustrates overlapping blocks of data spread across multiple packets, according to an embodiment.

FIG. 2 illustrates an example of a set of consecutive overlapping data blocks in the network flow 110. The length of each block is m, where m<K, and K is the length of a pattern. The data blocks B are shown as $B_i$, $B_{i+1}$, $B_{i+2}$, $B_{i+3}$, . . . . The data blocks overlap by a number of bytes. For example, if the block size is m bytes, the blocks overlap by a value of m−x. So, if the block size is 12 bytes and x is 9 bytes, the blocks overlap by 3 bytes.

FIG. 2 shows an example of how the blocks B may overlap and how a data block may be spread across multiple packets. For example, $B_{i+2}$ and $B_{i+3}$ are spread across packets P1 and P2. It will be apparent to one of ordinary skill in the art that the size of the blocks and the amount of overlap may be different than shown in FIG. 2. It should be noted that a pattern size K may be large enough such that the pattern is in multiple consecutive blocks that spread across multiple packets. For example, a pattern may be identified in the data blocks $B_{i+2}$ and $B_{i+3}$ shown in FIG. 2, or a pattern may be large enough to cover a set of consecutive blocks covering more than 2 packets.

As shown in FIG. 1, the hash unit 101 may be connected to a counter 103 that is incremented to keep track of the number of data blocks being hashed. For example, if a hash value calculated for a data block received in the network flow 110 matches a first hash value in a pattern being detected, the counter 103 is incremented. The counter 103 is incremented for every consecutive data block in the network flow matching the pattern. If the number of consecutive matching data blocks in the network flow matches the number of data blocks in the pattern, the pattern may be identified in the network flow. The counter value from the counter 103 is incremented and stored with each matching hash value in the packet CAM 104. Storing of the calculated hash values and counter values in the packet CAM 104 is described in further detail below with respect to FIG. 3B and the method 500 shown in FIG. 5. The counter 103 may be reset if the hash value of a data block does not match a hash value for the pattern or if the counter value for the data block does not match a counter value for the stored pattern, which is also described in further detail below.

The hash unit 101 may be connected to a small buffer 106 for storing partial data blocks. For example, data block $B_{i+2}$ is partially in packet P1 and partially in packet P2, as shown in FIG. 2. The buffer 106 shown in FIG. 1 may be used to store the portion of data block $B_{i+2}$ in packet P1 until the second portion of the data block $B_{i+2}$ in packet P2 is received. Then, the hash unit 101 can access the entire data block $B_{i+2}$, and calculate a hash for the entire data block.

The match detection unit 102 matches hash values and counter values representing patterns stored in the pattern CAM 105 with hash values and counter values for data blocks in the network flow 110. Pattern detection in the network flow 110 which may be performed using the match detection unit 102 is described with respect to FIG. 3B and the method 500.

The pattern detection system 100 may use CAMs 104 and 105 to store hash values and counter values for patterns and network flows. Other types of memory may alternatively be used to store the data described as being stored in the CAMs 104 and 105. However, CAMs provide for fast access to data stored in the CAMs when compared to memory fetches for data stored in main memory or other types of memory having longer access times, which may improve pattern detection speed.

FIGS. 3A and 3B show examples of data stored in the pattern CAM 105 and the packet CAM 104. The pattern CAM 105 is shown in FIG. 3A. Each entry in the pattern CAM 105 may include a representation of a pattern. Only one entry is shown, but representations for multiple patterns may be stored in the pattern CAM 105.

Figure 4:
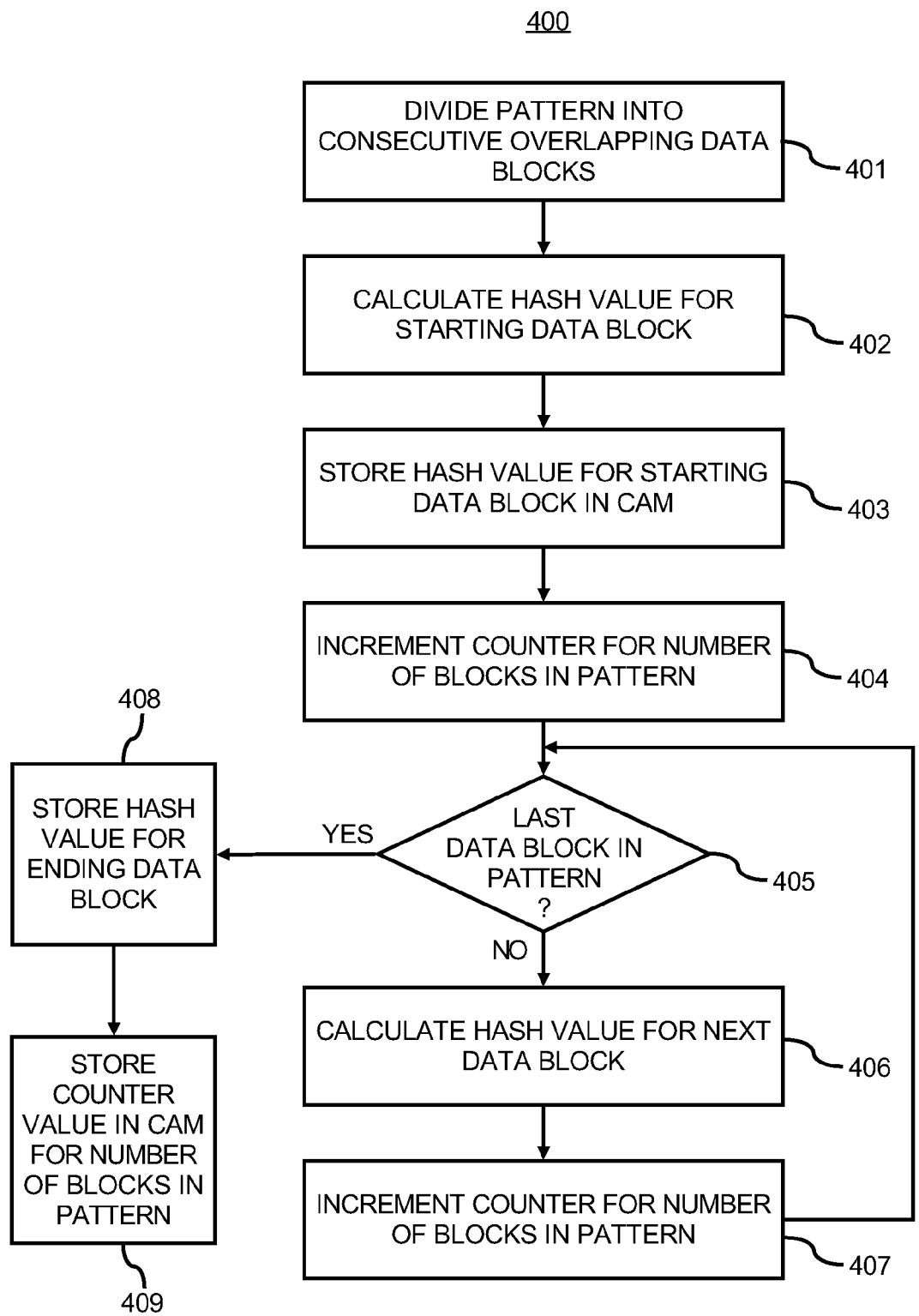
FIGS. 4 illustrates a flowchart of a method for creating a representation of a pattern, according to an embodiment.

In one embodiment, a representation of a pattern comprises a starting hash value, which is a hash of a first data block in the pattern, an ending hash value, which is a hash of a last data block in the pattern, and a count of the number of data blocks in the pattern. The pattern CAM 105 shown in FIG. 3A includes fields for storing a "Starting Hash", an "Ending Hash" and "Number of Blocks". The "Starting Hash" includes a hash of the starting data block for a pattern. The "Ending Hash" includes a hash of the ending data block for a pattern. The "Number of Blocks" is the count of the number of consecutive data blocks in the pattern. A hash is computed for each of the sequence of data blocks in a pattern. The CAM may store a subset of the hash values instead of all of the hash values for the sequence of data blocks in the pattern. In particular, the subset may comprise the starting and ending hash values for the pattern. For example, hashes may be calculated for the sequence of data blocks in the pattern. The intermediate hash values are discarded and only the starting and ending hash value are stored. It should be noted that the ending hash value depends on all the data blocks in the pattern and also on the sequence of the data blocks. Hence if blocks are permuted the ending hash value will be different. Thus, the ending hash value uniquely identifies a sequence of blocks which make up the pattern, when used in combination with the starting hash value and the count of blocks in the pattern. This hash values and counter values are small enough to fit into commodity CAMs. FIG. 4 describes creating a pattern representation, which may be stored in the pattern CAM 105 in more detail.

FIG. 4 describes a method 400 for creating a representation of a pattern, which may be stored in the pattern CAM 105, according to an embodiment. The method 400 is described with respect to system 100 shown in FIG. 1 by way of example and not limitation. The system 100 may be used to create the pattern representations. For example, the system 100 may operate in a pattern generation mode to create and store pattern representations. Alternatively, another system may be used to create the pattern representations and these representations are then stored in the pattern CAM 105.

At step 401, the pattern is divided into consecutive overlapping data blocks, such as shown in FIG. 2. Both the network flow 110 and the pattern are divided into consecutive overlapping data blocks. The size of the data blocks and the amount of overlap is the same for the network flow 110 and the pattern. The hash unit 101 shown in FIG. 1 may divide the pattern into the data blocks, for example, by hashing predetermined amounts of data, equivalent to the data block size, in the packet payloads of the network flow 110. Also, the packet payloads may be stored in the buffer 106, so the hash unit 101 can identify a data block, including the portion of the data block overlapping the previous data block.

At step 402, a hash value is calculated for the starting bock of the pattern. A key is generated using a hash function for the starting data block of the pattern. A key is a hash value, and keys are also referred to as hash values herein. A hash function h( ) takes in the starting data block from the pattern and some pre-determined seed S as inputs to generate a key $k_1$, where $k_1 = h(B_1;S)$.

At step 403, the hash value is stored in the pattern CAM 105. The key, $k_1$, is stored as the staring hash value in the pattern CAM 105, as shown in FIG. 3A. Multiple pattern representations may be stored in the pattern CAM 105, so multiple patterns may be detected in a network flow. FIG. 3A shows an entry for one of the patterns. The hash unit 101 may be used to calculate the hash values.

At step 404, a counter is incremented for counting the number of data blocks in the pattern. For example, the hash unit 101 may increment the counter 103.

At step 405, a determination is made as to whether the last data block in the pattern has been hashed. The patterns may be short and thus can include a string having a size less than or equal to a size of a data block. However, many patterns may be larger than a single data block.

At step 406, if the last block in the pattern has not been hashed, the same hash function h( ) is used to calculate a hash value for the next consecutive data block. For example, the hash unit generates a key, $k_2$, for the next consecutive data block in the pattern, where $k_2=h(B_2; k_1)$. Thus, $k_2$ is a hash of the data block and the previous key. At step 407, a count of the number of data blocks is incremented to for example a count value of 2 representing that number of data blocks in the pattern so far. Steps 405-407 are repeated for each consecutive data block in the pattern until the last data block is reached. Once, the key, i.e., hash value, for the last data bock in the pattern is computed and the counter is incremented, the count value is stored in the pattern CAM 105 as the number of data blocks in the pattern. Also, the last key is stored in the pattern CAM 105 in the entry for the pattern. This is shown as steps 408 and 409. FIG. 3A shows the number of data blocks as n, and the last key as $k_n$ for the pattern representation. Intermediate keys calculated for data blocks between the starting data block and the ending data block for the pattern may be discarded to save storage space. Also, the method 400 may be used to create representations of multiple patterns for storage in pattern CAM 105.

FIG. 3B shows an example of data stored in the packet CAM 104. Data is stored in the packet CAM 104 to determine whether a pattern is detected in the network flow 110 shown in FIG. 1. When a match is detected between a hash of a first data block in the network flow and hash of the first data block in a pattern stored in the pattern CAM 105, the hash of the first data block is stored in the packet CAM 104. Then, consecutive data blocks are hashed using the hash values calculated for previous data blocks. Because the hash value for a data block, such as $B_{i+1}$ shown in FIG. 2, is calculated from a hash value for a previous data block, such as $B_i$ shown in FIG. 2, pattern detection is able to be performed for data blocks spread across multiple packets.

The hash values for the consecutive data blocks are stored in the packet CAM 104 under "Current Content Hash", along with a count of the number of data blocks hashed that match the pattern under "Blocks Covered". For example, if a calculated hash value $k_i$ matches a starting hash of a pattern stored in the pattern CAM 105, the number of blocks for that pattern are retrieved from the pattern CAM 105 and stored in the "Blocks Covered" field in the packet CAM 104. Then, that count value is decremented until it reaches zero for each consecutive data block received and hashed. If the last calculated hash value when the count value equals zero matches the ending hash for the pattern retrieved from the pattern CAM 105, then the pattern is detected. As shown in FIG. 3B, the hash values are calculated for each consecutive block until n=0, where n is the number of blocks in the pattern. Then if the current content hash $k_n$ when n=0 matches the ending hash for the last block in the pattern (also $k_n$), the pattern is detected. In this example, the hashes match so the pattern is detected.

If the current content hash when n=0 does not equal the hash of the last data block in the pattern, then the pattern is not detected. Then, a hash of the next data block in the flow is calculated and compared to the starting hashes for the patterns to start the process again for determining whether a pattern is detected. The pattern detection and the hash values stored in the packet CAM 104 are further described with respect to FIGS. 5A and 5B.

FIG. 3B shows all the intermediate hash values stored in the packet CAM 104 to illustrate the pattern detection process. According to an embodiment, the packet CAM 104 may only store a single entry for the last calculated hash value, because only the last calculated hash value is needed to calculate the hash value for the next data block until n=0. In this embodiment, the entry may be overwritten for each calculated hash value for each data block so only a single entry is stored for a particular pattern detection. Other entries may also be stored in the CAM 104 for detecting different patterns, and each entry includes a last calculated hash value for detecting a particular pattern.

The packet CAM 104 may also include a field for a "Flow Hash". The flow hash may be used to uniquely identify a network flow. The entries shown in the packet CAM 104 are for a single flow, so they have the same flow hash. The flow hash may be a hash of a unique flow ID.

Figure 5A:
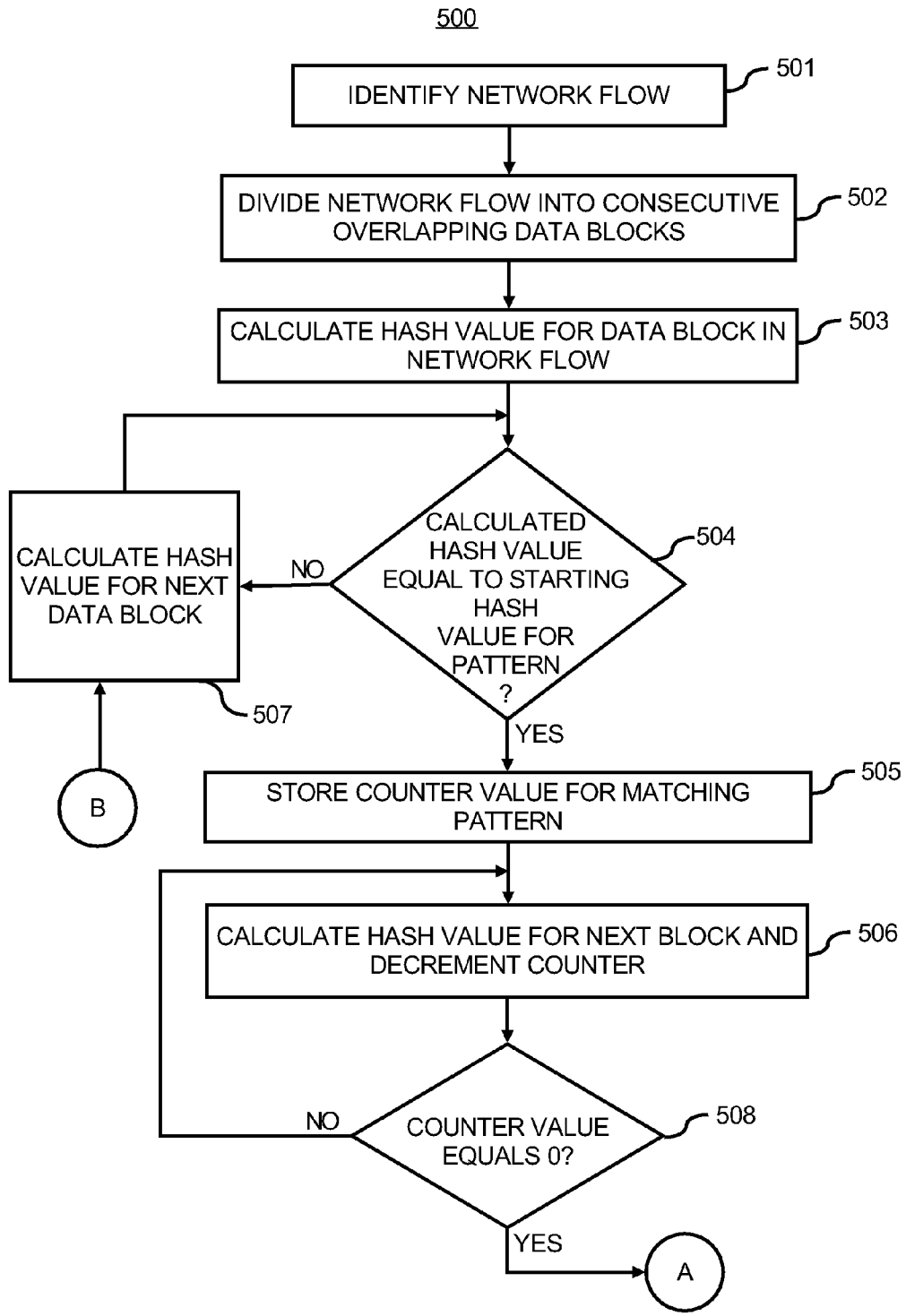
FIGS. 5A and 5B illustrate a flowchart of a method for detecting a pattern in a network flow, according to an embodiment.
Figure 5B:
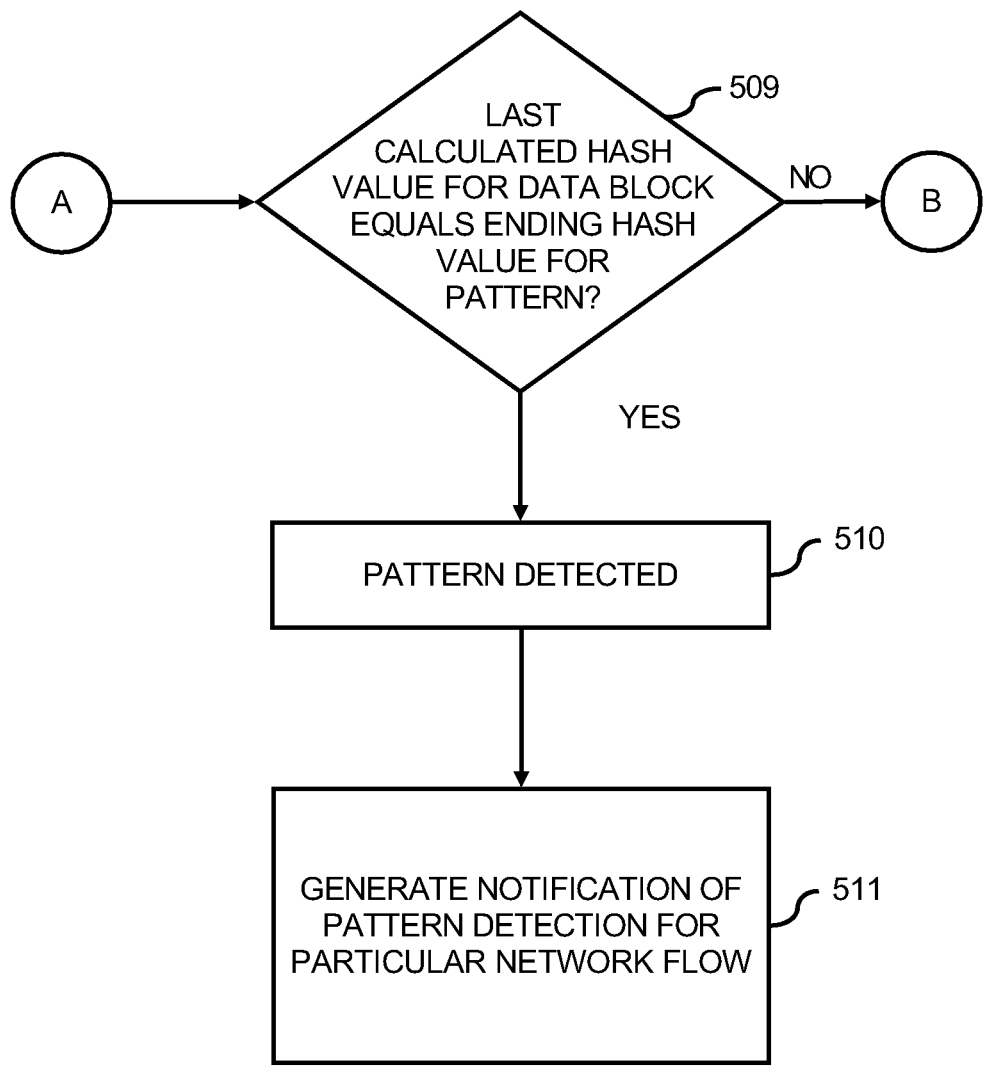

FIGS. 5A and 5B show a method 500 for detecting a pattern in a network flow, according to an embodiment. The method 500 is described by way of example and not limitation using the system 100 shown in FIG. 1 and the FIGS. 2-3B.

At step 501, the network flow is identified. For example, the network flow 110 shown in FIG. 1 is identified by a set of indices, such as source and destination IP addresses or ports. The hash unit 101 or another unit may identify the network flow.

At step 502, the network flow is divided into consecutive overlapping data blocks, such as shown in FIG. 2. Both the network flow and the pattern are divided into consecutive overlapping data blocks. The size of the data blocks and the amount of overlap is the same for the network flow and the pattern. The hash unit 101 shown in FIG. 1 may divide the network flow 110 into the data blocks, for example, by hashing predetermined amounts of data, equivalent to the data block size, in the packet payloads of the network flow 110. Also, the packet payloads may be stored in the buffer 106, so the hash unit 101 can identify a data block, including the portion of the data block overlapping the previous data block.

At step 503, a hash value is calculated for a data block in the network flow. The same hash function h( ) used to determine the keys for the pattern, such as described with respect to the method 400, is also used to determine the keys for the network flow. Also, the same seed S is used. For example, a key, $k_i$, is computed for the data $B_i$ shown in FIG. 2, where $k_i=h(B_i;S)$. The hash unit 101 may calculate the hash value.

At step 504, a determination is made, for example, by the match detection unit 102 shown in FIG. 1, as to whether the calculated hash value for the data block in the network flow is equal to the hash value for the starting data block in the pattern. For example, the pattern CAM 105 stores the key $k_1$, which is the key for the starting data block in the pattern, and $k_i$ is the key calculated at step 503. If the calculated hash value for the data block in the network flow is equal to the hash value for the starting data block in the pattern, i.e., if $k_1=k_i$, such as determined at step 504, then at step 505 the count of number of blocks is stored in the packet CAM 104 for example under "Blocks Covered". Otherwise step 507 is performed to determine whether a hash of the next data block in the network flow matches a first hash of a pattern.

At step 506, a hash value is calculated for the next data block in the network flow using the hash value calculated for the previous data block in the network flow and the count of number of blocks is decremented by one. The calculated hash value is stored in the packet CAM 104.

At step 508, a determination is made as to whether the count of the number of blocks equals zero. If not, step 506 is repeated. If the count equals zero, at step 509 a determination is made as to whether the current content hash is equal to the ending hash for the last data block in the pattern. If no, the pattern is not detected and step 507 is repeated. If yes, at step 510, the pattern is detected. For example, the number of blocks covered in the network flow equals the number of blocks in the pattern and the starting and ending hashes match.

At step 511, a notification is generated indicating the pattern is detected for a particular flow. The flow may be identified using the flow ID or the hash of the flow ID. Although not shown, the pattern CAM 105 may also store a pattern ID or a hash of a pattern ID for each representation of a pattern stored in the packet CAM 104. Then, the notification generated at step 515 may also identify the particular pattern that was detected. As discussed above, the pattern CAM 105 may store pattern representations for many different patterns, and the system 100 may detect whether any of the patterns are detected in a network flow using the methods 400 and 500 and other steps described herein.

The notification generated at step 511 may be used by other systems that require pattern detection. For example, databases, network security and computer vision or imaging systems may receive the notification that the pattern is detected and use this notification to perform a task.

Figure 6:
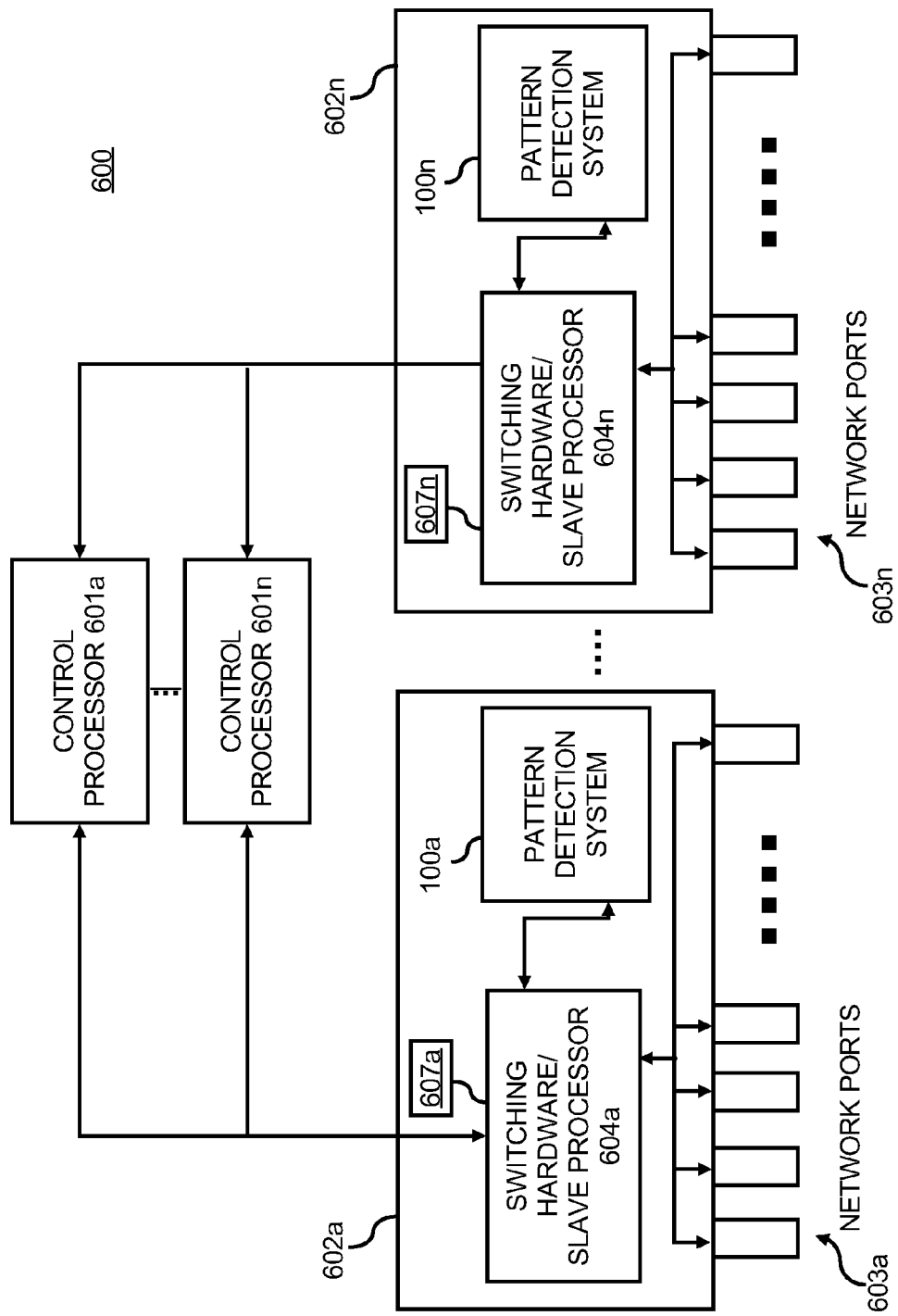
FIG. 6 illustrates a network switch, according to an embodiment.

FIG. 6 illustrates a block diagram of a network switch 600 that may include the system 100 shown in FIG. 1. FIG. 6 is a high-level, generic block diagram of a switch, and the switch may include many conventional elements not shown.

The switch 600 includes one or more control processors 601 for performing routing in the switch and other known functions. Control processors 601*a-n* are shown. The switch 600 also includes multiple line cards 602. Multiple line cards 602*a-n* are shown, each including similar components. Each line card includes ports 603 and switching hardware/slave processor 604. The ports 603 send and receive data on a network. The switching hardware/slave processor 604 may include or be connected to memory 607. The memory 607 may store data and/or a computer program or firmware.

The switching hardware/slave processor 604 is connected to the pattern detection system 100, which includes CAMs 104 and 105 and the other components shown in FIG. 5. The pattern detection system 100 may perform pattern detection at a line-rate speed for network flows received on the ports 603. The pattern detection system 100 may be hardware or a combination of hardware and software. In one embodiment, computer instructions for the software portion of the system 100 may be stored in the memory 607 and executed by the switching hardware/slave processor 604 or be executed by a processor in the system 100.

One or more of the steps of the methods 400 and 500 and other steps described herein may be implemented as software, hardware or a combination of hardware and software. Software is embedded on a computer readable medium, such as memory and executed, for example, by a processor. The memory may include the memory 607 and the processor may include the switching hardware/slave processor 604. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A method of matching a pattern in a network flow across multiple packets, the method comprising:
   storing a representation of the pattern, wherein the representation includes a plurality of hash values each representing a block of data in the pattern;
   receiving a network flow including a stream of packets;
   dividing the packets into a set of consecutive, overlapping blocks of data;
   a processor calculating hash values for the blocks of data in the network flow, wherein the blocks of data are spread across multiple packets in the stream of packets; and
   comparing the calculated hash values for the blocks of data in the network flow to the hash values in the representation of the pattern to detect the pattern in the network flow.

2. The method of claim 1, wherein storing a representation of the pattern comprises:
   storing hash values for only a subset of all the blocks of data in the pattern.

3. The method of claim 2, wherein the subset of all the blocks of data comprises a starting block of data and an ending block of data in the pattern.

4. The method of claim 1, further comprising:
   storing a count of all the blocks of data in the pattern.

5. The method of claim 4, further comprising:
   determining a count of the blocks of data in the network flow for which the hash values are calculated; and
   comparing the determined count to the stored count of all the blocks of data in the pattern to detect the pattern.

6. The method of claim 1, wherein the blocks of data have equal lengths.

7. The method of claim 6, further comprising:
   storing a count of all the blocks of data in the pattern;
   determining a count of the blocks of data in the network flow for which the hash values are calculated; and
   comparing the determined count to the stored count of all the blocks of data in the pattern to detect the pattern.

8. The method of claim 1, further comprising:
   wherein storing a representation of the pattern comprises storing the representation of the pattern in a first content addressable memory;
   storing the calculated hash values in a second content addressable memory; and detecting the pattern in the network flow at line-rate speed by retrieving data from the first and second content addressable memories for comparison.

9. A method of detecting a pattern across multiple packets in a network flow using a plurality of hash values and data block counts, the method comprising:
   storing a representation of the pattern, wherein the representation includes a first hash value representing a starting block of data in the pattern and a last hash value representing an ending block of data in the pattern, and the representation includes a count of all the blocks of data in the pattern;
   receiving a network flow including a stream of packets;
   a processor calculating hash values for a plurality of blocks of data in the network flow;
   determining a count of the blocks of data in the network flow for which the hash values are calculated; and
   detecting the pattern in the network flow if
      a first calculated hash value of the calculated hash values matches the first hash value representing a starting block of data in the pattern,
      a last calculated hash value of the calculated hash values matches the last hash value representing the ending block of data in the pattern, and
      the determined count of the blocks of data in the network flow for which the hash values are calculated equals the count of all the blocks of data in the pattern.

10. The method of claim 9, further comprising:
    receiving a packet in the network flow;
    calculating the first hash value from a block of data in the packet;
    determining whether the first calculated hash value matches the first hash value representing the starting block of data in the pattern;
    if the first calculated hash value does not match the first hash value representing the starting block of data in the pattern, then calculating another hash value from a next consecutive block of data from the first packet or from the first and a second consecutive packet in the network flow for comparison to the first hash value representing the starting block of data in the pattern.

11. The method of claim 10, further comprising:
    if the first calculated hash value matches the first hash value representing the starting block of data in the pattern, then
       calculating a next hash value from a next consecutive block of data from the first packet or from the first and a second packet in the network flow, and
       decrementing a counter representing a count of blocks in the pattern.

12. The method of claim 11, further comprising:
    determining whether the counter equals zero;
    if the counter equals zero, then determining whether the calculated next hash value equals a hash of the ending block in the pattern; and if the next hash value equals the hash of the ending block in the pattern, then determining the pattern is detected.

13. The method of claim 12, wherein if the counter does not equal zero, then repeating calculating a next hash value from a next consecutive block of data in the network flow, and decrementing the counter representing the count of blocks in the pattern until the counter equals zero; and
    when the counter equals zero, determining whether the calculated hash value equals the hash of the ending block in the pattern to determine whether the pattern is detected.

14. The method of claim 12, wherein if the next hash value does not equal the hash of the ending block in the pattern, then determining the pattern is not detected.

15. The method of claim 9, wherein a same hash function is used to calculate the hash values for the plurality of blocks of data in the network flow and the hash values for the pattern.

16. A pattern detection system operable to detect a pattern in a network flow, the system comprising:
    at least one memory storing a representation of the pattern and storing a count of all blocks of data in the pattern, wherein the representation includes a plurality of hash values each representing a block of data in the pattern;
    a hash unit calculating hash values for blocks of data in the network flow, wherein the blocks of data are spread across multiple packets in the stream of packets; and
    a pattern detection unit comparing the calculated hash values for the blocks of data in the network flow to the hash values in the representation of the pattern to detect the pattern in the network flow, determining a count of the blocks of data in the network flow for which the hash values are calculated, and comparing the determined count to the stored count of all the blocks of data in the pattern to detect the pattern.

17. The system of claim 16, wherein the at least one memory comprises at least one content addressable memory storing the representation of the pattern and the calculated hash values, and the pattern detection unit is operable to detect a pattern in the network flow by accessing the hash values stored in the at least one content addressable memory.

18. The system of claim 17, wherein the pattern detection system including the at least one content addressable memory are provided in a line card in a network switch, and the pattern detection system is operable to detect the pattern in the network flow at a line-rate speed.

19. The system of claim 18, wherein the pattern detection system receives packets in the network flow at the line-rate speed from at least one network port in the line card.

20. The system of claim 16, wherein the plurality of hash values in the representation of the pattern only include hash values for a starting block of data and an ending block of data in the pattern.

* * * * *